United States Patent [19]

Saito

[11] Patent Number: 4,476,978
[45] Date of Patent: Oct. 16, 1984

[54] DISC ACCOMMODATING CASE
[75] Inventor: Takashi Saito, Ayase, Japan
[73] Assignee: Victor Company of Japan, Ltd., Yokohama, Japan
[21] Appl. No.: 381,490
[22] Filed: May 24, 1982
[30] Foreign Application Priority Data Jun. 1, 1981 [JP] Japan ............................ 56-80735[U]

[51] Int. Cl.³ ..................... G11B 5/82; G11B 25/04; B65D 85/30
[52] U.S. Cl. ................................. 206/444; 206/312; 360/97; 360/133
[58] Field of Search .................... 360/97, 98, 99, 133, 360/132, 135, 86; 206/444, 313, 312, 309; 220/4 B, 4 E, 306, 6

[56] References Cited

U.S. PATENT DOCUMENTS

| | | | |
|---|---|---|---|
| 4,159,827 | 7/1979 | Torrington | 206/444 X |
| 4,164,782 | 8/1979 | Stewart | 360/133 |
| 4,239,108 | 12/1980 | Coleman et al. | 206/312 |
| 4,266,784 | 5/1981 | Torrington | 206/312 X |
| 4,360,845 | 11/1982 | Tajima et al. | 360/133 |
| 4,419,709 | 12/1983 | Saito | 360/133 |

FOREIGN PATENT DOCUMENTS 0013712 6/1980 European Pat. Off. .
2018719 10/1979 United Kingdom .

Primary Examiner—Allan N. Shoap
Assistant Examiner—Bryon Gehman
Attorney, Agent, or Firm—Ladas & Parry

[57] ABSTRACT

A disc accommodating case comprises a jacket having an opening at one end thereof for accommodating a disc recorded with an information signal within an internal space, and a lid member for closing the opening of the jacket accommodating the disc. The lid member comprises a lid main body which fits within the opening of said jacket; a pair of engaging fingers provided on the right and left sides of the lid main body, for engaging with corresponding depressions formed at the inner part of said jacket; and metal leaf spring arm members respectively fixed to the lid main body and supporting the engaging finger at a tip end thereof. The metal leaf spring members are capable of being bent resiliently along the width direction of the lid member.

2 Claims, 14 Drawing Figures

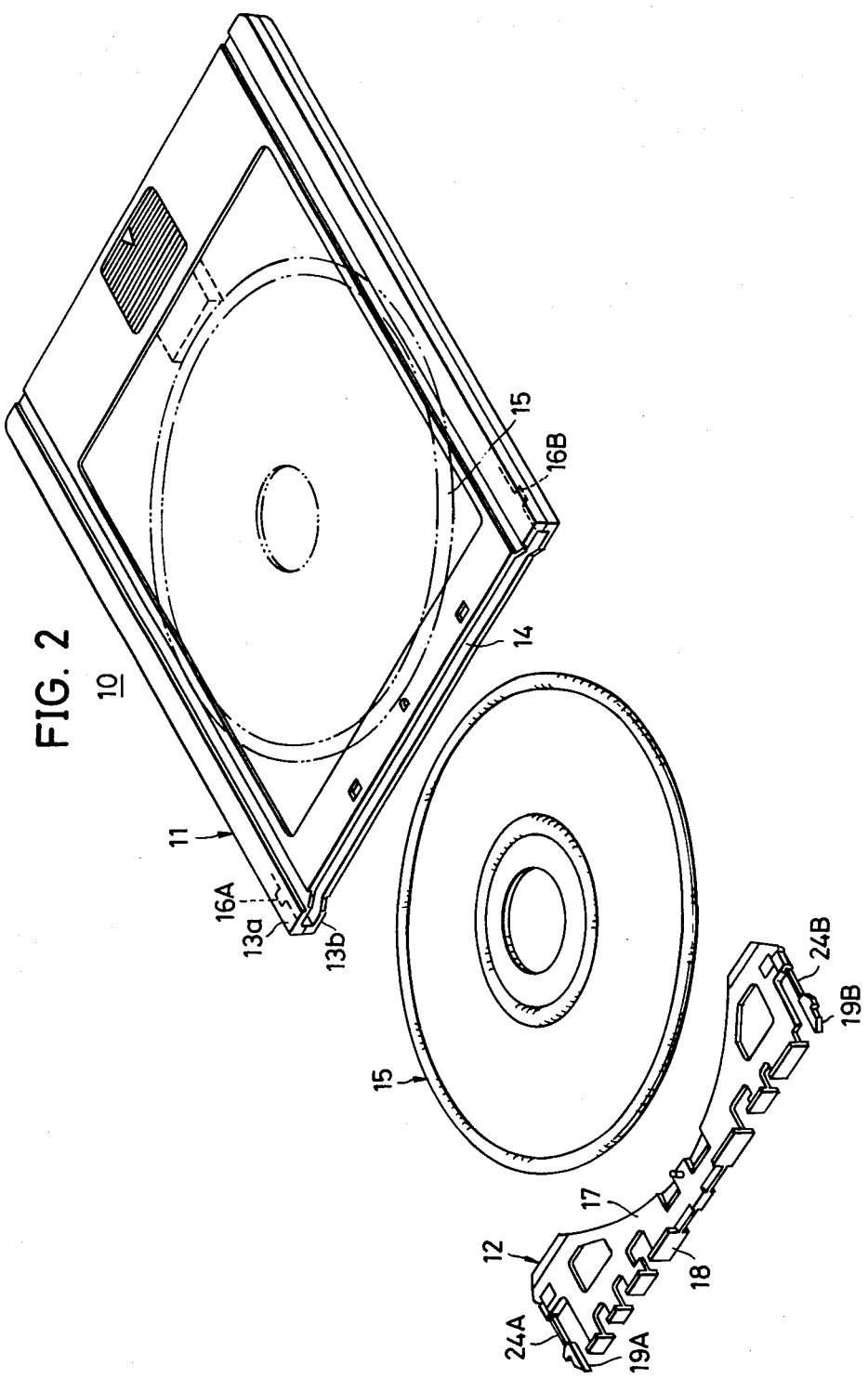

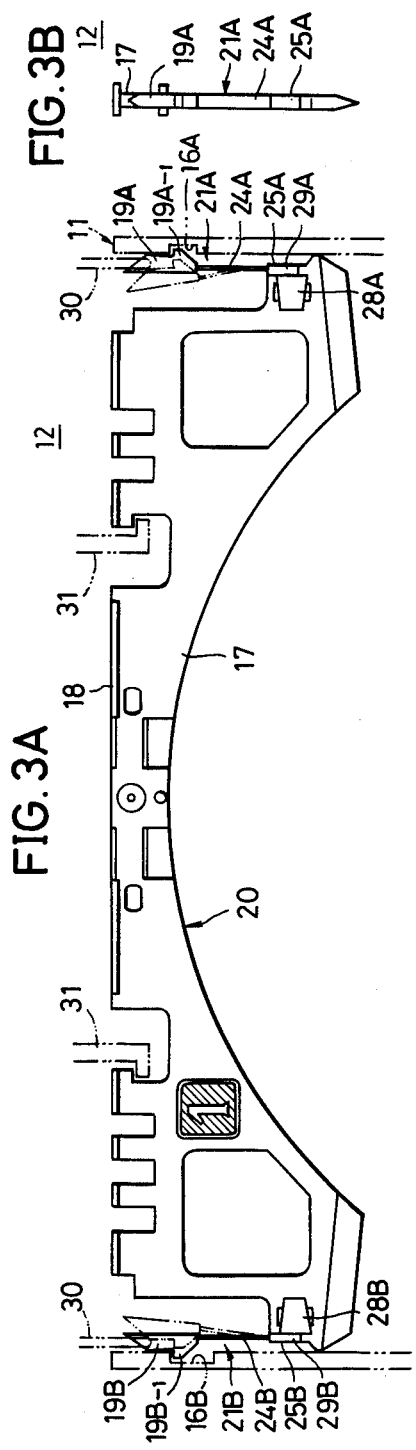
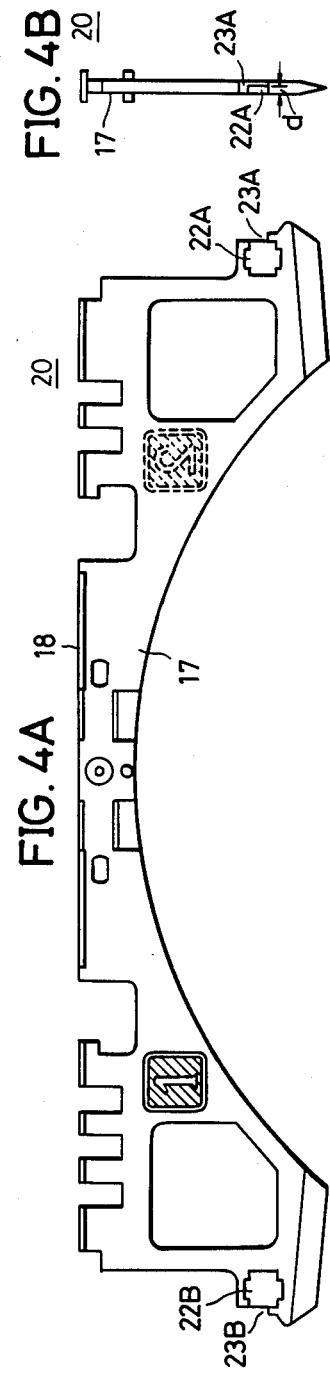

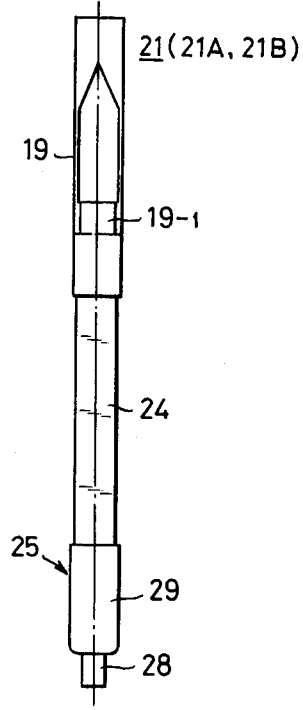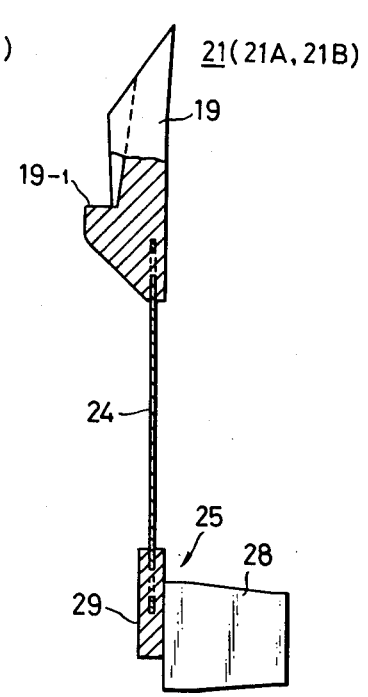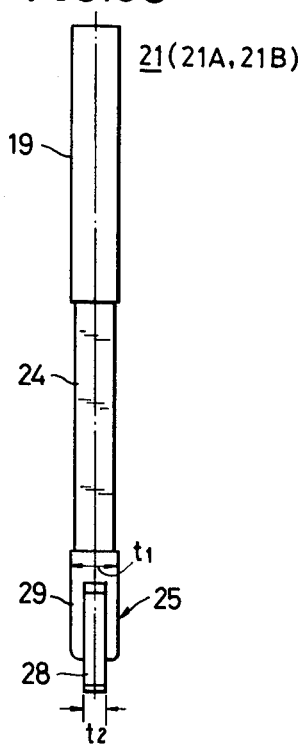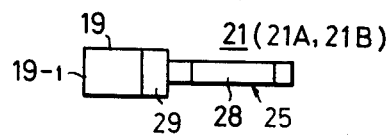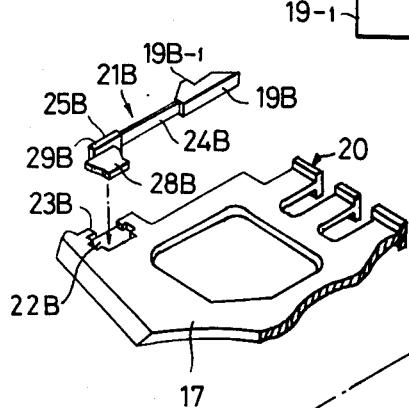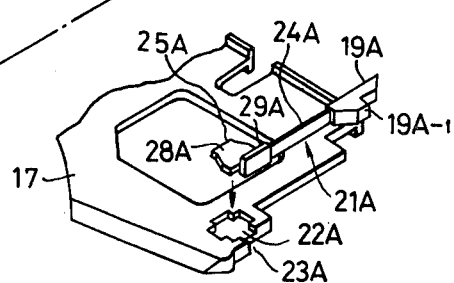

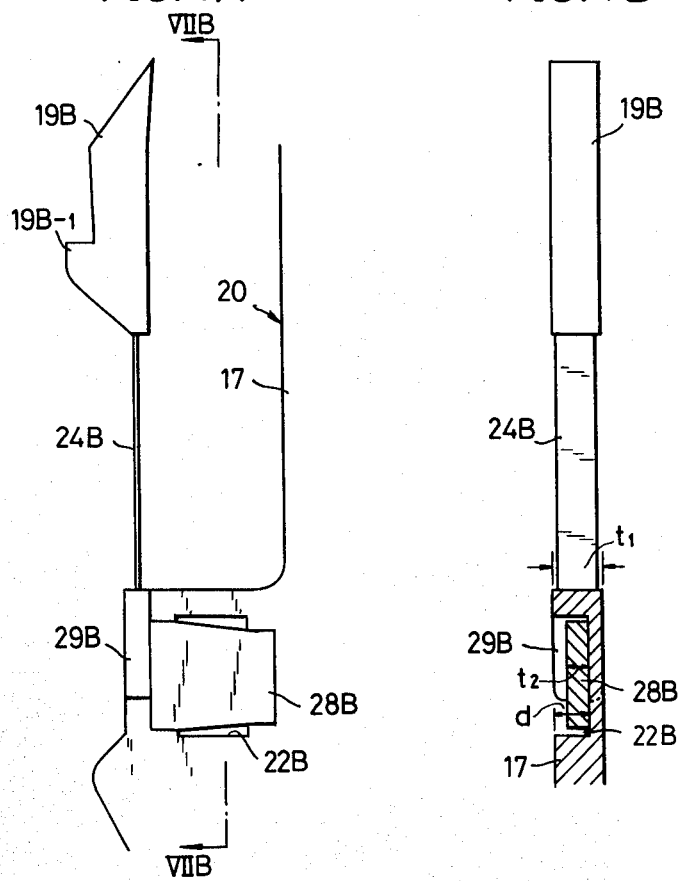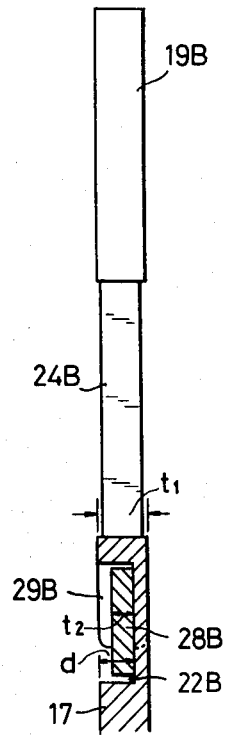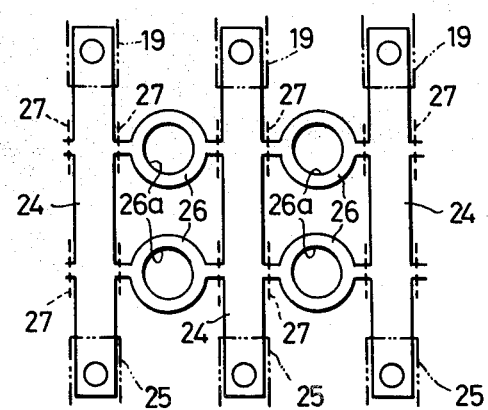

DISC ACCOMMODATING CASE

BACKGROUND OF THE INVENTION

The present invention generally relates to cases for accommodating rotary recording mediums (hereinafter simply referred to as discs), and more particularly to a disc accommodating case in which connection between a lid and a jacket can be positively performed.

Conventionally, cases have been proposed for accommodating a disc such as a video disc recorded with a video signal and an audio disc recorded with a pulse code modulated (PCM) audio signal. In this type of a disc case, the disc remains at a predetermined position within a reproducing apparatus by performing an operation in which the disc case having the disc accommodated therein is inserted within the reproducing apparatus and then pulled out from the reproducing apparatus. The disc within the reproducing apparatus is incased inside the disc case when the empty disc case is inserted into the reproducing apparatus, so that the disc can be obtained outside the reproducing apparatus in a state accommodated within the disc case. A disc accommodating case of this type is proposed in a U.S. patent application Ser. No. 263,851, now U.S. Pat. No. 4,419,709 entitled "CASE FOR A DISC-SHAPED RECORDING MEDIUM" filed on May 14, 1981 in which the assignee is the same as that of the present application. This previously proposed disc case comprises a jacket having a space for accommodating the disc and an opening for allowing the disc to go in and out of the jacket, and a lid member inserted through the opening of the jacket for closing the opening of the jacket. The lid member has resilient arms provided on the right and left ends, and these resilient arms can be deformed and bent along the width direction of the lid member. Engaging fingers are respectively provided at tip ends of these arms, and these engaging fingers engage with depressions which are formed on the inner side at the right and left parts of the jacket in the vicinity of the jacket opening. The arms and the engaging fingers are unitarily formed with the lid main body, and both are made of a resin. This disc accommodating case operates together with recording medium reproducing apparatus provided with an inserting opening through which the case is inserted, an engagement releasing member for releasing the connection between the lid member and the jacket, a lid member holding member, and a disc clamping member provided at the innermost part of the recording medium reproducing apparatus opposite to the inserting opening with respect to a turntable which rotates the disc, and a jacket opening enlarging member provided in the vicinity of the inserting opening, capable of moving between the position in the vicinity of the inserting opening and the innermost part of the recording medium reproducing apparatus above the turntable.

Upon reproduction of the disc, the disc accommodating case is inserted into the reproducing apparatus through the inserting opening. The arms of the lid member are resiliently bent by the engagement releasing member, so that the engaging fingers slip out from the depressions in the jacket. Accordingly, the engagement of the lid member with respect to the jacket is released. The lid member which is released of the connection, is held by the holding member. Moreover, when the disc case is inserted into the innermost part of the reproducing apparatus, the clamping member enters from the enlarged opening of the jacket to clamp the disc within the jacket. The jacket is pulled out in an empty state leaving behind the lid member held by the holding member and the disc clamped by the clamping member, when the jacket is pulled out from within the reproducing apparatus in a direction opposite to the direction of the insertion. In addition, the empty jacket is inserted into the reproducing apparatus when the reproduction is completed. This time, the disc relatively enters within the jacket, and the holding with respect to the lid member by the holding member is released. The arms of the lid member disengage from the engagement releasing member, and are resiliently restored to their natural states. The engaging fingers thus enter within the depressions in the jacket, and the lid member accordingly becomes engaged with the jacket.

Accordingly, the lid member is held at the innermost part of the reproducing apparatus during reproduction, and even after the reproduction is completed unless the disc is recovered from within the reproducing apparatus. When the lid member is in the held state, the arms engage with the connection releasing member and remain in inwardly bent states. However, since these arms are made of resin, if the disc reproducing operation is performed under a high temperature and high humidity condition with a temperature of 55° C. and a humidity of 90%, for example, or if the disc is left within the reproducing apparatus in an unrecovered state in the above condition with high temperature and high humidity, the resin will soften. Therefore, the arms will undergo plastic deformation and will remain in the inwardly bent states, and will not be restored resiliently even when the arms disengage from the engagement releasing member. Thus, the engaging fingers cannot be restored even after disengaging from the engagement releasing member until these fingers enter within the depressions in the jacket. Hence, there was a serious disadvantage in that the lid member may not engage with the jacket. This means that it may become impossible to recover the disc within the disc case, and an accident may occur in which the lid member falls within the reproducing apparatus.

SUMMARY OF THE INVENTION

Accordingly, it is a general object of the present invention to provide a novel and useful disc accommodating case in which the above described disadvantages have been overcome.

Another and more specific object of the present invention is to provide a disc accommodating case assembled from a lid having arms which respectively have an engaging finger at a tip end thereof, and a jacket, wherein the arms are made of metal plate spring members. According to the disc accommodating case of the present invention, the arms will be restored resiliently when these arms disengage from an engagement releasing member, even when the reproducing apparatus is used under a severe condition. This ensures positive engagement of the lid with respect to the jacket, and the disc will be positively recovered within the disc accommodating case.

Other objects and further features of the present invention will be apparent from the following detailed description when read in conjunction with the accompanying drawings.

BRIEF DESCRIPTION OF THE DRAWINGS

FIG. 2 is a disassembled perspective view showing the disc accommodating case shown in FIG. 1 in a state where a lid is detached from a jacket;

FIGS. 3A and 3B are a plan view and a side view, respectively showing a lid;

FIGS. 4A and 4B are a plan view and a side view, respectively showing a lid main body;

FIGS. 5A, 5B, 5C, and 5D are a view from the left side, a front view partly in cross section, a view from the right side, and a view from a base part of an arm, respectively showing an engagement finger assembly;

FIG. 6 is a perspective view, partly in cross section, showing a manner in which an engaging finger assembly is assembled to a lid main body;

FIG. 7A is a view showing the construction of a left engaging arm assembly at a mounting part to a lid, in an enlarged scale;

FIG. 7B is a view in cross section taken along a line VIIB—VIIB in FIG. 7A; and

FIG. 8 shows a leaf spring member in a state before it is formed by insert molding.

DETAILED DESCRIPTION

Figure 1:
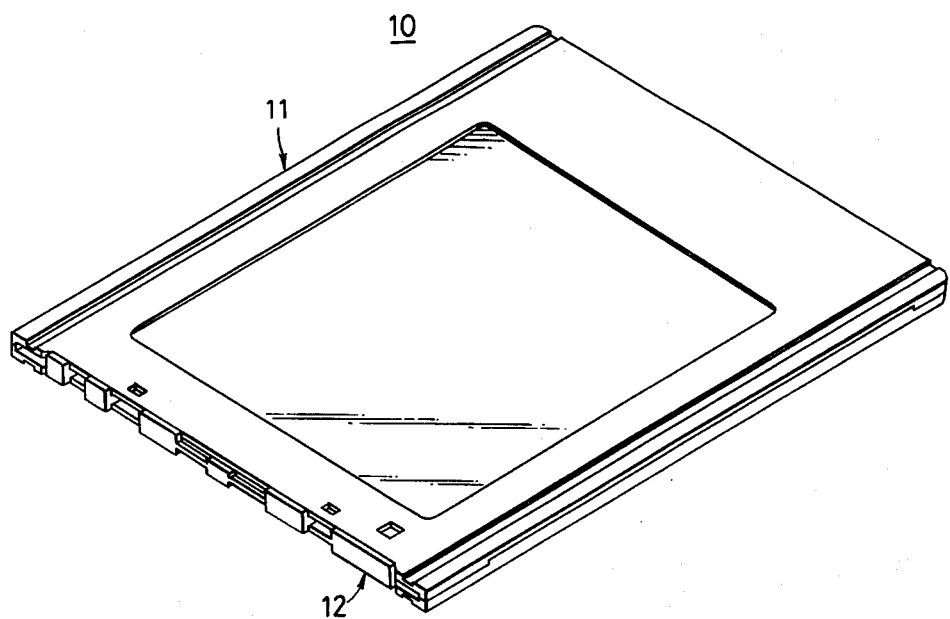
FIG. 1 is a perspective view showing an embodiment of a disc accommodating case according to the present invention.

In FIGS. 1 and 2, a disc case 10 comprises a jacket 11 and a lid 12. The jacket 11 and the lid 12 have substantially symmetric shapes with respect to the right and left sides thereof. Constituting elements of the jacket 11 and the lid 12 are designated by reference numerals with a subscript "A" for those parts on the left side in FIGS. 1 and 2, and by the same reference numerals with a subscript "B" for those corresponding parts on the right side in FIGS. 1 and 2. A reference numeral without the subscript is used when the description does not relate to a specific side. The jacket 11 is assembled from a pair of jacket halves 13a and 13b, and comprises a flat cavity or space therein. This space is open at an opening 14 at the front side of the jacket 11 and is closed on the other three sides, and accommodates a disc 15. The thickness of the above space is slightly larger than that of the disc 15. In addition, depressions 16A and 16B are respectively formed in the left and right side walls at the inner part of the jacket 11 in the vicinity of the opening 14. As will be described hereinafter, engaging fingers enter into these depressions 16A and 16B.

The lid 12 comprises a plate-shaped part 17 which is inserted into the front portion of the space through the opening 14 of the jacket 11 and closes the opening 14, and a rim portion 18 formed unitarily at the front edge of the plate-shaped part 17. This rim portion 18 is fixed to the front edge of the jacket 11 and does not enter within the opening 14. Engaging fingers 19A and 19B of the lid 12 respectively engage with the depressions 16A and 16B, to connect the lid 12 and the jacket 11.

Next, description will be given with respect to the construction of the above lid 12, by referring to FIGS. 3A through 7.

The lid 12 has a construction shown in FIGS. 3A and 3B. This lid 12 is obtained by assembling an engaging finger assembly 21 (21A, 21B) shown in FIGS. 5A through 5D onto a lid main body 20 shown in FIGS. 4A and 4B, in a manner shown in FIGS. 6, 7A, and 7B.

As shown in FIGS. 4A and 4B, the lid main body 20 has a configuration comprising no engaging fingers or arms. Depressions 22A and 22B and cutouts 23A and 23B are respectively formed on the right and left sides of the lid main body 20 in FIGS. 4A and 4B, for mounting the engaging finger assembly 21 (21A, 21B). The depressions 22A and 22B are respectively provided on the upper surface of the plate-shaped part 17.

The engaging finger assembly 21 is mainly constructed from a stainless steel leaf spring member 24 which has a thickness of about 0.2 millimeters, as shown in FIGS. 5A through 5D. An engaging finger 19 is provided at one end of the leaf spring member 24, and a base 25 is provided at the other end, that is, the root part of the leaf spring member 24, by insert molding. In the manufacturing process of the leaf spring member 24, originally, as shown in FIG. 8, a plurality of leaf spring members 24 are integrally connected by connecting parts 26, and are positioned by use of a hole 26a in each of the connecting parts 26. Accordingly, insert molding is simultaneously performed with respect to the plurality of leaf spring members 24. After the insert molding, each of the leaf spring members 24 are cut at the connecting parts 26 along cutting lines 27 indicated by dotted lines in FIG. 8, in order to form individual engaging finger assemblies 21. Thus, the engaging finger assembly 21 can be manufactured with ease at low cost.

The leaf spring member 24 functions as the arm in the conventional disc accommodating case. The base 25 comprises a rectangular flat plate portion 28 and a flange 29 for supporting the leaf spring member 24.

The above engaging finger assembly 21 has a shape symmetrical with respect to a center line (center plane of the leaf spring member along the bending direction) in FIGS. 5A and 5C. Hence, the same engaging arm assembly 21 can be used for the right and left engaging fingers, by reversing its direction (refer to FIG. 6). Accordingly, there is no need to separately manufacture the right and left engaging finger assemblies 21A and 21B, and the manufacturing cost is reduced because the same assembly 21 can be used for the right and left sides. In addition, the troublesome control of parts is simplified.

The thickness t1 of the flange 29 at the base 25 is set to a value equal to the thickness (t1) of the plate-shaped part 17. Furthermore, a relationship $d > t2$ exists between the depth d of the depressions 22A and 22B in the plate-shaped part 17 and the thickness t2 of the flat plate portion 28 at the base 25. This relationship between the depth d and the thickness t2 is determined so that the upper and lower surfaces of the flange 29 and the engaging finger 19 coincide with the surfaces of the plate-shaped part 17 as shown in FIGS. 7A and 7B so that the flat plate portion 28 is completely fit into the depression 22.

As shown in FIG. 6, the engaging finger assemblies 21A and 21B are assembled with respect to the lid 20 by welding or adhering, by finely fitting the rectangular flat plate portions 28A and 28B of the bases 25A and 25B into the depressions 22A and 22B which have shapes corresponding to those of the flat plate portions 28A and 28B, and fitting the flanges 29A and 29B into the cutouts 23A and 23B, as indicated by one-dot chain lines, in a state where projections 19A-1 and 19B-1 of the engaging fingers 19A and 19B face the outer sides. In this assembled state, the flat plate portion 28 is lower than the surface of the plate-shaped part 17, and the upper and lower surfaces of the flange 29 coincide with the surfaces of the plate-shaped part 17 as shown in FIG. 7B. Thus, the engaging finger 19 at the tip end of the engaging arm assembly 21 is accurately positioned, and the engaging arm assembly 21 is strongly fixed to the lid main body 20.

The lid main body 20 is constructed so that the depressions 22A and 22B for mounting the engaging finger assembly are provided on the same surface side. This is to allow the mounting of the engaging finger assembly with respect to the main lid body 20, from the same surface side (upper surface, for example). Further, by use of this construction, it becomes unnecessary to reverse the side of the lid main body 20 to mount the engaging finger assembly on one side after the engaging finger assembly on the other side is mounted. The assembling operation of the lid 12 is accordingly simplified.

In the lid 12 having the above described construction, the engaging fingers 19A and 19B are maintained at the positions indicated in FIG. 3A, by the resilient forces exerted by the leaf spring members 24A and 24B. The projections 19A-1 and 19B-1 of these engaging arms 19A and 19B respectively engage with the depressions 16A and 16B provided within the jacket 11. When the disc case 10 (jacket 11) is inserted into and then pulled out of the reproducing apparatus upon reproduction of the disc, the engaging arms 19A and 19B of the lid engage with engagement releasing members 30 within the reproducing apparatus as shown by two-dot chain lines in FIG. 3A, and are bent inwards. Hence, the projections 19A-1 and 19B-1 slip out from the depressions 16A and 16B. The engagement between the lid 12 and the jacket 11 is thus released, and the lid 12 is held inside the reproducing apparatus by holding members 31.

After the disc is loaded into the reproducing apparatus, the lid 12 is maintained in the above state for a relatively long time, that is, until the disc is unloaded to be recovered within the disc case. In the above state where the disc is loaded, the engaging finger 19 is bent inwards accompanying resilient deformation of the metal leaf spring member 24. Accordingly, even when the above state where the disc is loaded is maintained for an extended period of time, or when the reproducing apparatus is used under a severe condition where the temperature and humidity are high, permanent deformation is not introduced in the leaf spring member 24. When the holding by the engagement releasing members 30 is released, the leaf spring member 24 is immediately restored resiliently to its linear state. Thus, the engaging fingers 19A and 19B are deformed outwards, and the projections 19A-1 and 19B-1 respectively engage with the depressions 16A and 16B of the jacket 11. Therefore, the lid 12 and the jacket 11 are connected positively, and the disc 15 is recovered within the disc case 10.

The above resilient deformation of the leaf spring member 24 (24A, 24B) upon loading of the disc acts as a resistive force against the disc case inserting operation. Accordingly, some resistance is present when the disc case is inserted into the reproducing apparatus. In the conventional disc case, it is necessary to set the thickness of the arm which has the engaging finger at the tip end thereof to a small value, in order to reduce the required disc case inserting force. However, if the thickness of the arm is set to a small value, it becomes difficult to mold the arm and degradation will be introduced in the accuracy with respect to the dimension of the arms. Moreover, the connection between the lid and the jacket becomes unstable. Thus, in reality, it was necessary to give the arm a certain thickness, and the improvement in reducing the required disc case inserting force could not be performed satisfactorily. However, in the above described embodiment of the invention, the leaf spring member is used as the arm. Hence, the problems with respect to the molding of the arm and the unstable connection between the lid and the jacket are eliminated. Furthermore, by using a leaf spring member of a suitable thickness, the force required to deform the engaging fingers to the extent shown by the two-dot chain lines can be reduced to under 80 grams. Therefore, the required disc case inserting force is accordingly reduced to improve the operating characteristics.

In the above embodiment of the invention, the engaging finger assembly 21 is prepared separately from the lid main body 20, and the engaging finger assembly 21 is afterward assembled with respect to the lid main body 20. However, the construction is not limited to the above, and the engaging arm 19 and the lid main body 20 may be formed by insert molding with respect to the metal leaf spring member. In this case, the leaf spring member is held directly by the lid main body 20.

Further, the present invention is not limited to these embodiments, but various variations and modifications may be made without departing from the scope of the present invention.

What is claimed is:

1. A disc accommodating case comprising a jacket having an opening at one end thereof for accommodating a disc recorded with an information signal within an internal space, and a lid member for closing the opening of the jacket accommodating the disc, said lid member comprising:

a lid main body which fits within the opening of said jacket;

a pair of engaging fingers provided on the right and left sides of said lid main body, for engaging with corresponding first depressions formed at the inner part of said jacket;

metal leaf spring arm members respectively fixed to said lid main body and supporting said engaging fingers at respective tip ends thereof, said metal leaf spring members capable of being bent resiliently along the width direction of said lid member, said leaf spring arm members having bases at their respective ends opposite said tip ends; and said bases having rectangular plane configurations fixed to said lid main body, said bases having thicknesses smaller than the thickness of said lid main body, root parts of said metal leaf spring arm members being fixed to said bases to constitute engaging arm assemblies together with said bases, said engaging arm assemblies being symmetrical to the right and left with respect to a center plane along bending directions of said metal leaf spring arm members, said lid main body comprising second depressions provided in the vicinity of the right and left ends on the same surface thereof, said second depressions having rectangular contours corresponding to the rectangular plane configurations of said bases so that bases of said engaging arm assemblies closely fit into and become fixed with respect to said second depressions, and having depths of dimensions such that said engaging fingers lie on the same plane as said lid main body when said bases are fitted into said second depressions.

2. A disc accommodating case as claimed in claim 1 in which said engaging arm assemblies are formed by insert molding the engaging fingers and said bases with respect to said metal leaf spring members.

* * * * *